United States Patent
Kumar et al.

(10) Patent No.: US 10,122,611 B2
(45) Date of Patent: Nov. 6, 2018

(54) UNIVERSAL DEVICE TESTING INTERFACE

(71) Applicant: Contec, LLC, Schnectady, NY (US)

(72) Inventors: Samant Kumar, San Jose, CA (US); Dinesh Kumar, Bihar (IN); Shivashankar Diddimani, Karnataka (IN); Gunjan Samaiya, Madya Pradesh (IN)

(73) Assignee: Contec, LLC, Schenectady, NY (US)

( * ) Notice: Subject to any disclaimer, the term of this patent is extended or adjusted under 35 U.S.C. 154(b) by 245 days.

(21) Appl. No.: 14/866,752

(22) Filed: Sep. 25, 2015

(65) Prior Publication Data

US 2017/0093683 A1    Mar. 30, 2017

(51) Int. Cl.
| | |
|---|---|
| *G06F 11/273* | (2006.01) |
| *H04L 12/26* | (2006.01) |
| *H04L 29/06* | (2006.01) |
| *G06F 11/36* | (2006.01) |
| *H04L 29/08* | (2006.01) |

(52) U.S. Cl.
CPC ............ *H04L 43/50* (2013.01); *G06F 11/273* (2013.01); *G06F 11/2733* (2013.01); *G06F 11/3668* (2013.01); *H04L 67/04* (2013.01); *H04L 69/16* (2013.01); *H04L 67/02* (2013.01)

(58) Field of Classification Search
CPC ...................................................... H04L 69/00
See application file for complete search history.

(56) References Cited

U.S. PATENT DOCUMENTS

| | | | |
|---|---|---|---|
| 5,005,197 A | 4/1991 | Parsons et al. | |
| 5,897,609 A | 4/1999 | Choi et al. | |
| 5,917,808 A | 6/1999 | Kosbab | |
| 6,088,582 A | 7/2000 | Canora et al. | |
| 6,308,496 B1 | 10/2001 | Lee | |
| 6,367,032 B1 | 4/2002 | Kasahara | |
| 6,662,135 B1 | 12/2003 | Burns | |
| 6,671,160 B2 | 12/2003 | Hayden | |
| 6,826,512 B2 | 11/2004 | Dara-Abrams et al. | |
| 6,859,043 B2 | 2/2005 | Ewing | |
| 7,254,755 B2 | 8/2007 | De Obaldia et al. | |
| 7,664,317 B1 | 2/2010 | Sowerby | |
| 7,809,517 B1 | 10/2010 | Zuckerman | |
| 8,121,028 B1 | 2/2012 | Schlesener | |
| 8,209,732 B2 | 6/2012 | Le et al. | |
| 8,229,344 B1 | 7/2012 | Petersen | |
| 8,324,909 B2 | 12/2012 | Oakes et al. | |
| 8,418,000 B1 | 4/2013 | Salame | |
| 8,418,219 B1 | 4/2013 | Parsons et al. | |
| 8,515,015 B2 | 8/2013 | Maffre | |

(Continued)

FOREIGN PATENT DOCUMENTS

| | | |
|---|---|---|
| CN | 202261360 | 5/2012 |
| WO | 2001013604 | 2/2001 |

(Continued)

OTHER PUBLICATIONS

Kumar, Samant; Issue Notification for U.S. Appl. No. 14/866,780, filed Sep. 25, 2015, dated Oct. 19, 2016, 1 pg.

(Continued)

*Primary Examiner* — Cheung Lee
(74) *Attorney, Agent, or Firm* — Taylor English Duma LLP

(57) ABSTRACT

An operator dashboard (user interface) used for testing disparate devices simultaneously and independently and further capable of asynchronous communication is disclosed.

20 Claims, 3 Drawing Sheets

(56) References Cited

U.S. PATENT DOCUMENTS

| | | |
|---|---|---|
| 8,689,071 B2 | 4/2014 | Valakh |
| 8,806,400 B1 | 8/2014 | Bhawmik |
| 9,013,307 B2 | 4/2015 | Hussain |
| 9,270,983 B1 | 2/2016 | Hare, Jr. |
| 9,316,714 B2 | 4/2016 | Rada |
| 9,319,908 B2 | 4/2016 | Nickel |
| 9,372,228 B2 | 6/2016 | Nickel |
| 9,402,601 B1 | 8/2016 | Berger |
| 9,490,920 B2 | 11/2016 | Partee |
| 9,491,454 B1 | 11/2016 | Kumar |
| 9,571,211 B2 | 2/2017 | Partee |
| 9,810,735 B2 | 11/2017 | Kumar et al. |
| 9,838,295 B2 | 12/2017 | Kumar et al. |
| 9,900,113 B2 | 2/2018 | Kumar et al. |
| 9,900,116 B2 | 2/2018 | Kumar et al. |
| 9,960,989 B2 | 5/2018 | Kumar et al. |
| 9,992,084 B2 | 6/2018 | Kumar et al. |
| 2002/0070725 A1 | 6/2002 | Hilliges |
| 2002/0077786 A1 | 6/2002 | Vogel et al. |
| 2003/0005380 A1 | 1/2003 | Nguyen |
| 2003/0184035 A1 | 10/2003 | Yu |
| 2004/0010584 A1 | 1/2004 | Peterson |
| 2004/0016708 A1 | 1/2004 | Rafferty |
| 2004/0160226 A1 | 8/2004 | Ewing |
| 2004/0189281 A1 | 9/2004 | Le et al. |
| 2004/0203726 A1 | 10/2004 | Wei |
| 2005/0041642 A1 | 2/2005 | Robinson |
| 2005/0053008 A1 | 3/2005 | Griesing |
| 2005/0102488 A1 | 5/2005 | Bullis |
| 2005/0193294 A1 | 9/2005 | Hildebrant |
| 2005/0286466 A1 | 12/2005 | Tagg |
| 2006/0015785 A1 | 1/2006 | Chun |
| 2006/0271322 A1 | 11/2006 | Haggerty |
| 2007/0097659 A1 | 5/2007 | Behrens |
| 2007/0220380 A1 | 9/2007 | Ohanyan |
| 2008/0026748 A1 | 1/2008 | Alexander et al. |
| 2008/0117907 A1 | 5/2008 | Hein |
| 2008/0144293 A1 | 6/2008 | Aksamit |
| 2008/0159737 A1 | 7/2008 | Noble et al. |
| 2008/0168520 A1 | 7/2008 | Vanderhoff |
| 2008/0274712 A1 | 11/2008 | Rofougaran |
| 2008/0315898 A1 | 12/2008 | Cannon |
| 2009/0059933 A1 | 3/2009 | Huang |
| 2009/0089854 A1 | 4/2009 | Le |
| 2009/0213738 A1 | 8/2009 | Volpe et al. |
| 2009/0282446 A1 | 11/2009 | Breed |
| 2009/0282455 A1 | 11/2009 | Bell et al. |
| 2009/0289020 A1 | 11/2009 | Wurmhoringer |
| 2010/0132000 A1 | 5/2010 | Straub |
| 2010/0138823 A1 | 6/2010 | Thornley |
| 2010/0246416 A1 | 9/2010 | Sinha |
| 2011/0001833 A1 | 1/2011 | Grinkemeyer |
| 2011/0006794 A1 | 1/2011 | Sellathamby |
| 2011/0012632 A1 | 1/2011 | Merrow |
| 2011/0035676 A1 | 2/2011 | Tischer |
| 2011/0072306 A1 | 3/2011 | Racey |
| 2011/0090075 A1 | 4/2011 | Armitage et al. |
| 2011/0099424 A1 | 4/2011 | Rivera Trevino |
| 2011/0107074 A1 | 5/2011 | Chan et al. |
| 2011/0116419 A1 | 5/2011 | Cholas |
| 2011/0222549 A1 | 9/2011 | Connelly |
| 2011/0267782 A1 | 11/2011 | Petrick |
| 2011/0306306 A1 | 12/2011 | Reed |
| 2012/0140081 A1 | 1/2012 | Clements |
| 2012/0122406 A1 | 5/2012 | Gregg et al. |
| 2012/0163227 A1 | 6/2012 | Kannan |
| 2012/0198084 A1 | 8/2012 | Keskitalo |
| 2012/0198442 A1 | 8/2012 | Kashyap |
| 2012/0213259 A1 | 8/2012 | Renken et al. |
| 2012/0220240 A1 | 8/2012 | Rothschild |
| 2012/0275784 A1 | 11/2012 | Soto |
| 2012/0278826 A1 | 11/2012 | Jones |
| 2013/0033279 A1 | 2/2013 | Sozanski |
| 2013/0049794 A1 | 2/2013 | Humphrey |
| 2013/0076217 A1 | 3/2013 | Thompson |
| 2013/0093447 A1 | 4/2013 | Nickel |
| 2013/0104158 A1 | 4/2013 | Partee |
| 2013/0160064 A1 | 6/2013 | Van Rozen |
| 2013/0167123 A1 | 6/2013 | Dura |
| 2013/0257468 A1 | 10/2013 | Mlinarsky |
| 2013/0305091 A1 | 11/2013 | Stan et al. |
| 2014/0047322 A1 | 2/2014 | Kim |
| 2014/0091874 A1 | 4/2014 | Cook et al. |
| 2014/0115580 A1 | 4/2014 | Kellerman |
| 2014/0123200 A1 | 5/2014 | Park et al. |
| 2014/0126387 A1 | 5/2014 | Gintis |
| 2014/0156819 A1 | 6/2014 | Cavgalar |
| 2014/0187172 A1 | 7/2014 | Partee |
| 2014/0187173 A1 | 7/2014 | Partee |
| 2014/0207404 A1 | 7/2014 | Fritzsche |
| 2014/0256373 A1 | 9/2014 | Hernandez |
| 2014/0266930 A1 | 9/2014 | Huynh |
| 2014/0269386 A1 | 9/2014 | Chu |
| 2014/0269871 A1 | 9/2014 | Huynh |
| 2014/0282783 A1 | 9/2014 | Totten |
| 2014/0370821 A1 | 12/2014 | Guterman |
| 2015/0024720 A1 | 1/2015 | Efrati |
| 2015/0093987 A1 | 4/2015 | Ouyang |
| 2015/0109941 A1 | 4/2015 | Zhang |
| 2015/0151669 A1 | 6/2015 | Meisner |
| 2015/0180743 A1 | 6/2015 | Jana et al. |
| 2015/0226716 A1 | 8/2015 | Nelson |
| 2015/0237010 A1 | 8/2015 | Roskind |
| 2015/0253357 A1 | 9/2015 | Olgaard |
| 2015/0288589 A1 | 10/2015 | Radford et al. |
| 2015/0369851 A1 | 12/2015 | Even |
| 2016/0080241 A1 | 3/2016 | Rocha De Maria |
| 2016/0102951 A1 | 4/2016 | Cole |
| 2016/0191364 A1 | 6/2016 | Ajitomi |
| 2016/0381818 A1 | 12/2016 | Mills |
| 2017/0048519 A1 | 2/2017 | Friel |
| 2017/0089981 A1 | 3/2017 | Kumar |
| 2017/0093682 A1 | 3/2017 | Kumar |
| 2017/0126536 A1 | 5/2017 | Kumar |
| 2017/0126537 A1 | 5/2017 | Kumar |
| 2017/0126539 A1 | 5/2017 | Tiwari |
| 2017/0149635 A1 | 5/2017 | Kumar |
| 2017/0149645 A1 | 5/2017 | Kumar |
| 2017/0195071 A1 | 7/2017 | Kumar |
| 2017/0250762 A1 | 8/2017 | Kumar et al. |
| 2017/0288791 A1 | 10/2017 | Kumar et al. |
| 2017/0288993 A1 | 10/2017 | Kumar et al. |
| 2017/0289012 A1 | 10/2017 | Tiwari et al. |
| 2017/0302994 A1 | 10/2017 | Kumar |
| 2018/0024193 A1 | 1/2018 | Kumar et al. |
| 2018/0076908 A1 | 3/2018 | Kumar et al. |
| 2018/0077046 A1 | 3/2018 | Kumar et al. |

FOREIGN PATENT DOCUMENTS

| | | |
|---|---|---|
| WO | 2013169728 | 11/2013 |
| WO | 2014035462 | 3/2014 |
| WO | 2014065843 | 5/2014 |
| WO | 2017053961 | 3/2017 |
| WO | 2017074872 | 5/2017 |

OTHER PUBLICATIONS

Kumar, Samant; Notice of Allowance for U.S. Appl. No. 14/866,780, filed Sep. 25, 2015, dated Jul. 19, 2016, 8 pgs.

Kumar, Samant; Non-Final Office Action for U.S. Appl. No. 14/866,720, filed Sep. 25, 2015, dated Jan. 23, 2017, 7 pgs.

Kumar, Samant; Notice of Allowance for U.S. Appl. No. 14/987,538, filed Jan. 4, 2016, dated Mar. 23, 2017, 12 pgs.

Kumar, Samant; Non-Final Office Action for U.S. Appl. No. 15/057,085, filed Feb. 29, 2016, dated Apr. 7, 2017, 15 pgs.

Kumar, Samant; International Search Report and Written Opinion for PCT/US16/53768, filed Sep. 26, 2016, dated Feb. 3, 2017, 17 pgs.

Nordman, Bruce, "Testing Products with Network Connectivity," Jun. 21, 2011 [retrieved online at http://citeseerx.is1.psu.edu/viewdoc/download?doi=10.1.1.695.772&rep=rep1&type=pdf on Feb. 6, 2017], 20 pgs.

(56) References Cited

OTHER PUBLICATIONS

Kumar, Samant; International Search Report and Written Opinion for PCT/US2016/058507, filed Oct. 24, 2016, dated Jan. 3, 2017, 12 pgs.
Kumar, Samant; Issue Notification for U.S. Appl. No. 14/866,720, filed Sep. 25, 2015, dated Oct. 18, 2017, 1 pg.
Kumar, Samant; Notice of Allowance for U.S. Appl. No. 14/948,925, filed Nov. 23, 2015, dated Sep. 20, 2017, 15 pgs.
Kumar, Samant; Supplemental Notice of Allowance for U.S. Appl. No. 14/948,925, filed Nov. 23, 2015, dated Oct. 5, 2017, 2 pgs.
Kumar, Samant; Notice of Allowance for U.S. Appl. No. 15/057,085, filed Feb. 29, 2016, dated Sep. 29, 2017, 8 pgs.
Kumar, Samant; Non-Final Office Action for U.S. Appl. No. 14/866,630, filed Sep. 25, 2015, dated Aug. 9, 2017, 24 pgs.
Kumar, Samant; Notice of Allowance for U.S. Appl. No. 14/866,720, filed Sep. 25, 2015, dated Jun. 29, 2017, 26 pgs.
Kumar, Samant; Notice of Allowance for U.S. Appl. No. 14/866,720, filed Sep. 25, 2015, dated Aug. 28, 2017, 11 pgs.
Kumar, Samant; Response to Rule 312 Communication for U.S. Appl. No. 14/866,720, filed Sep. 25, 2015, dated Jul. 26, 2017, 2 pgs.
Kumar, Samant; Ex-Parte Quayle Office Action for U.S. Appl. No. 14/948,925, filed Nov. 23, 2015, dated Jun. 20, 2017, 29 pgs.
Kumar, Samant; Non-Final Office Action for U.S. Appl. No. 14/987,538, filed Jan. 4, 2016, dated Jul. 21, 2017, 18 pgs.
Kumar, Samant; Non-Final Office Action for U.S. Appl. No. 15/624,961, filed Jun. 16, 2017, dated Jul. 19, 2017, 7 pgs.
Kumar, Samant; Non-Final Office Action for U.S. Appl. No. 14/929,180, filed Oct. 30, 2015, dated Aug. 22, 2017, 32 pgs.
Kumar, Samant; Non-Final Office Action for U.S. Appl. No. 14/929,220, filed Oct. 30, 2015, dated Aug. 24, 2017, 31 pgs.
Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.
CED Magazine; Article entitled: "Cable Connects in Atlanta", located at <https://www.cedmagazine.com/article/2006/04/cable-connects-atlanta>, Apr. 30, 2006, 21 pgs.
S3 Group; Document entitled: "White Paper: The Importance of Automated Testing in Set-Top Box Integration", earliest known publication date Jun. 17, 2014, 11 pgs.
Digital Producer; Article entitled: "S3 Group Unveils Exclusive Partnership in North America With First US StormTest(TM) Decision Line Customer", located at <http://www.digitalproducer.com/article/S3-Group-Unveils-Exclusive-Partnership-in-North-America-With-First-US-StormTest(TM)-Decision-Line-Customer--1668213>, Sep. 8, 2011, 3 pgs.
Electronic Design; Article entitled: "Testing of MPEG-2 Set-Top Boxes Must be Fast, Thorough", located at <http://www.electronicdesign.com/print/839>, published Nov. 18, 2001, 9 pgs.
Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.
Teleplan; Article entitled: "Screening & Testing", located at <https://www.teleplan.com/innovative-services/screening-testing/>, earliest known publication date Mar. 21, 2015, 7 pgs.
Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.
Tvtechnology; Article entitled: "S3 Group's StormTest", located at <http://www.tvtechnology.com/expertise/0003/s3-groups-stormtest/256690>, published May 1, 2012, 2 pgs.
Kumar, Samant; Final Office Action for U.S. Appl. No. 15/642,915, filed Jul. 6, 2017, dated Apr. 5, 2018, 18 pgs.
Kumar, Samant; Issue Notification for U.S. Appl. No. 14/866,630, filed Sep. 25, 2015, dated Apr. 11, 2018, 1 pg.
Kumar, Samant; Supplemental Notice of Allowance for U.S. Appl. No. 14/866,630, filed Sep. 25, 2015, dated Jan. 31, 2018, 9 pgs.
Kumar, Samant; Supplemental Notice of Allowance for U.S. Appl. No. 14/866,630, filed Sep. 25, 2015, dated Mar. 30, 2018, 6 pgs.
Kumar, Samant; Certificate of Correction for U.S. Appl. No. 14/866,720, filed Sep. 25, 2015, dated Feb. 13, 2018, 1 pg.
Kumar, Samant; Notice of Allowance for U.S. Appl. No. 14/948,143, filed Nov. 20, 2015, dated Jan. 25, 2018, 13 pgs.
Kumar, Samant; Issue Notification for U.S. Appl. No. 14/987,538, filed Jan. 4, 2016, dated Jan. 31, 2018, 1 pg.
Kumar, Samant; Issue Notification for U.S. Appl. No. 15/057,085, filed Feb. 29, 2016, dated Jan. 31, 2018, 1 pg.
Kumar, Samant; Non-Final Office Action for U.S. Appl. No. 15/642,915, filed Jul. 6, 2017, dated Nov. 1, 2017, 42 pgs.
Kumar, Samant; Notice of Allowance for U.S. Appl. No. 14/866,630, filed Sep. 25, 2015, dated Dec. 20, 2017, 19 pgs.
Kumar, Samant; Issue Notification for U.S. Appl. No. 14/948,925, filed Nov. 23, 2015, dated Nov. 16, 2017, 1 pg.
Kumar, Samant; Non-Final Office Action for U.S. Appl. No. 14/948,143, filed Nov. 20, 2015, dated Dec. 28, 2017, 39 pgs.
Kumar, Samant; Corrected Notice of Allowance for U.S. Appl. No. 14/987,538, filed Jan. 4, 2016, dated Jan. 10, 2018, 8 pgs.
Kumar, Samant; Notice of Allowance for U.S. Appl. No. 14/987,538, filed Jan. 4, 2016, dated Dec. 4, 2017, 20 pgs.
Kumar, Samant; Response to Amendment under Rule 312 for U.S. Appl. No. 14/987,538, filed Jan. 4, 2016, dated Jan. 17, 2018, 2 pgs.
Kumar, Samant; Notice of Non-Compliant Amendment for U.S. Appl. No. 15/624,961, filed Jun. 16, 2017, dated Jan. 10, 2018, 5 pgs.
Kumar, Samant; Corrected Notice of Allowance for U.S. Appl. No. 15/057,085, filed Feb. 29, 2016, dated Oct. 31, 2017, 6 pgs.
Tiwari, Rajeev; Non-Final Office Action for U.S. Appl. No. 15/348,920, filed Nov. 10, 2016, dated Nov. 20, 2017, 53 pgs.
Tiwari, Rajeev; Non-Final Office Action for U.S. Appl. No. 15/624,967, filed Jun. 16, 2017, dated Nov. 7, 2017, 52 pgs.
Kumar, Samant; Issue Notification for U.S. Appl. No. 14/948,143, filed Nov. 20, 2015, dated May 16, 2018, 1 pg.
Kumar, Samant; Supplemental Notice of Allowance for U.S. Appl. No. 14/948,143, dated Nov. 20, 2015, dated May 7, 2018, 7 pgs.
Kumar, Samant; Notice of Allowance for U.S. Appl. No. 15/624,961, filed Jun. 16, 2017, dated May 22, 2018, 44 pgs.
Kumar, Samant; Final Office Action for U.S. Appl. No. 14/929,180, filed Oct. 30, 2015, dated May 8, 2018, 35 pgs.
Kumar, Samant; Final Office Action for U.S. Appl. No. 14/929,220, filed Oct. 30, 2015, dated May 10, 2018, 38 pgs.
Tiwari, Rajeev; Final Office Action for U.S. Appl. No. 15/348,920, filed Nov. 10, 2016, dated Apr. 30, 2018, 34 pgs.
Tiwari, Rajeev; Final Office Action for U.S. Appl. No. 15/624,967, filed Jun. 16, 2017, dated May 8, 2018, 40 pgs.
Kumar, Samant; International Preliminary Report on Patentability for PCT Application No. PCT/US2016/053768, dated Sep. 26, 2016, dated Apr. 5, 2018, 13 pgs.
Kumar, Samant; International Preliminary Report on Patentability for PCT Application No. PCT/US2016/058507, filed Oct. 24, 2016, dated May 11, 2018, 12 pgs.
Kumar, Samant; Advisory Action for U.S. Appl. No. 15/642,915, filed Jul. 6, 2017, dated Jul. 23, 2018, 18 pgs.
Kumar, Samant; Non-Final Office Action for U.S. Appl. No. 15/624,950, filed Jun. 16, 2017, dated Jul. 9, 2018, 50 pgs.
Kumar, Samant; Corrected Notice of Allowance for U.S. Appl. No. 15/624,961, filed Jun. 16, 2017, dated Jun. 28, 2018, 7 pgs.
Kumar, Samant; Advisory Action for U.S. Appl. No. 14/929,180, filed Oct. 30, 2015, dated Jul. 27, 2018, 9 pgs.
Kumar, Samant; Advisory Action for U.S. Appl. No. 14/929,220, filed Oct. 30, 2015, dated Jul. 27, 2018, 8 pgs.
Kumar, Samant; Non-Final Office Action for U.S. Appl. No. 15/818,803, filed Nov. 25, 2017, dated Jul. 25, 2018, 46 pgs.
Tiwari, Rajeev; Advisory Action for U.S. Appl. No. 15/348,920, filed Nov. 10, 2016, dated Jul. 17, 2018, 8 pgs.
Tiwari, Rajeev; Advisory Action for U.S. Appl. No. 15/624,967, filed Jun. 16, 2017, dated Jul. 17, 2018, 7 pgs.

UNIVERSAL DEVICE TESTING INTERFACE

CROSS REFERENCE TO RELATED APPLICATIONS

This application is related to patent application Ser. No. 14/866,630 entitled, "Universal Device Testing System," filed Sep. 25, 2015 and published Mar. 30, 2017 as U.S. Patent Application Publication No. 2017/0093682, and to patent application Ser. No. 14/866,720 entitled, "Core Testing Machine," filed Sep. 25, 2015, now U.S. Pat. No. 9,810,735, and to patent application Ser. No. 14/866,780 entitled, "Set Top Boxes Under Test," filed Sep. 25, 2015, now U.S. Pat. No. 9,491,454, each of which is hereby incorporated by reference in its entirety. This application is also related to patent application Ser. No. 14/948,143 entitled, "Cable Modems/eMTAs Under Test," filed Nov. 20, 2015 and published May 25, 2017 as U.S. Patent Application Publication No. 2017/0149635, and to patent application Ser. No. 14/948,925 entitled, "Wireless Routers Under Test," filed Nov. 23, 2015, now U.S. Pat. No. 9,838,295, and to patent application Ser. No. 14/929,180 entitled, "Hardware Architecture for Universal Testing System: Cable Modem Test," filed Oct. 30, 2015 and published May 4, 2017 as U.S. Patent Application Publication No. 2017/0126536, and to patent application Ser. No. 14/929,220 entitled, "Hardware Architecture for Universal Testing System: Wireless Router Test," filed Oct. 30, 2015 and published May 4, 2017 as U.S. Patent Application Publication No. 2017/0126537, and to patent application Ser. No. 14/987,538 entitled, "Test Sequences Using Universal Testing System", filed Jan. 4, 2016 and published Jul. 6, 2017 as U.S. Patent Application Publication No. 2017/0195071.

TECHNICAL FIELD

The present invention is directed to a system for testing devices.

DETAILED DESCRIPTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, a testing system provides a separate set of interfaces to be tested for each device that is under testing of the set of devices. Further, such a system is designed to be adaptive by being extendable for testing new devices with corresponding new testing interfaces without fundamentally changing the core architecture of the testing system. As a non-limiting example, the testing system includes a core testing subsystem with a user interface and asynchronous communication among the system components such that new types of devices and new tests can be added and executed in a seamless fashion. According to certain embodiments, the testing system is capable of testing a set of similar types of devices or a set of disparate devices, wherein the plurality of devices are tested simultaneously by the testing system.

Figure 1:
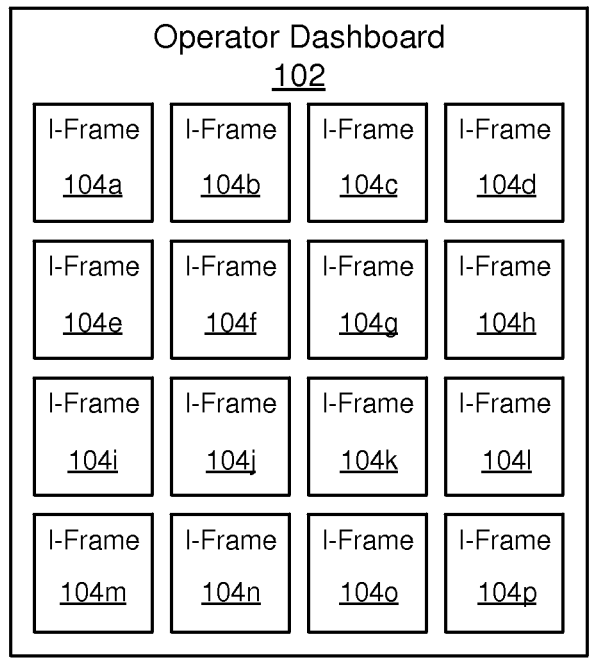
FIG. 1 illustrates a high-level operator dashboard for interacting with the core testing execution environment, according to certain embodiments.

FIG. 1 illustrates a high-level operator dashboard for interacting with the core testing execution environment, according to certain embodiments. FIG. 1 shows an operator dashboard 102 (user interface) that is capable of asynchronous communication with a core testing subsystem associated with testing a plurality of devices simultaneously. Operator dashboard 102 includes a plurality of I-Frames 104$a$-$p$ in HTML (inline frames). The HTML inline frame element represents a nested browsing context, effectively embedding another HTML page into the current page.

The embodiments are not restricted to the number of I-Frames shown in FIG. 1. The number of I-Frames may vary from implementation to implementation. Each I-Frame corresponds to a slot in the test bench for testing the devices. A device that is to be tested (device under test or DUT) is installed in a slot in the test bench. According to certain embodiments, different types of devices can be installed in the slots in the test bench for simultaneous testing. In other words, the slots in the test bench are not restricted to testing same types of devices. Disparate devices can be tested simultaneously in the test bench. The respective tests associated with each slot do not interfere with tests running in other slots in the test bench. Non-limiting examples of devices under test (DUTs) include set top boxes, cable modems, embedded multimedia terminal adapters, and wireless routers including broadband wireless routers for the home or for commercial networks.

According to certain embodiments, operator dashboard 102 may be implemented as a neutral platform such as a web-based browser. Such a web-based browser type of operator dashboard can offer flexible access to a user that is at the same location as the test bench or from a laptop, mobile phone, tablet, etc., that is remote from the test bench.

According to certain embodiments, the HTML based I-Frames in operator dashboard 102 allow a user to send commands and interact with the core testing execution machine with respect to each DUT and independently of other DUTs installed in the test bench such that the user can run tests for all the installed DUTs simultaneously. Further, the user can control and monitor the tests for all the installed DUTs simultaneously using the I-Frames of operator dashboard 102. According to certain embodiments, the user can configure slot details (e.g., port numbers, IP address for the slot, etc), configure testing preferences such as push to cloud, export to billing, etc. The I-Frames provide the requisite isolation for executing the tests of each of the DUTs in the test bench simultaneously but independently of each other. In other words, the DUTS installed in the test bench can all be tested in parallel without conflicting with each other.

Figure 2:
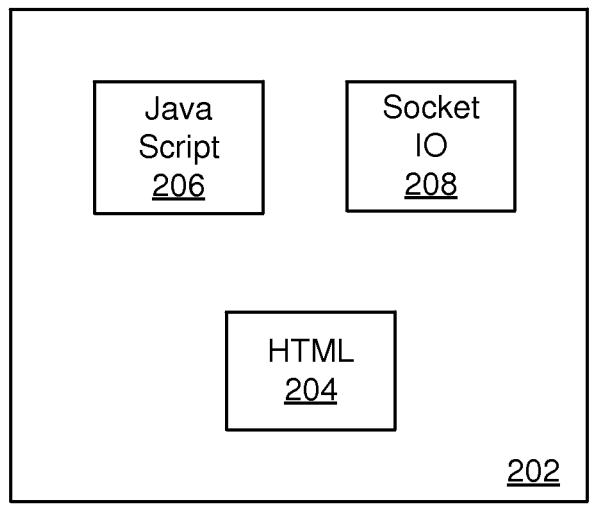
FIG. 2 illustrates some components of a sample I-Frame, according to certain embodiments.

FIG. 2 illustrates some components of a sample I-Frame, according to certain embodiments. FIG. 2 shows an I-Frame 202 that includes HTML 204, Java script 206 and a client side web-socket IO 208. As described herein, each I-Frame in the operator dashboard (user interface) is mapped to one of the slots in the test bench which is completely different from the run-of-the-mill client-server (web) architecture. In the run-of-the-mill client-server (web) architecture, the user makes a request and a corresponding HTML output is served up to the user's browser. In contrast, the operator dashboard with a plurality of I-Frames, each of which is mapped to a DUT in the test bench, can provide real-time continuous feedback to the user for each DUT once the user initiates test execution for the DUTs. For example, the user can use a respective I-Frame to receive feedback such as testing progress and testing results associated with a specific DUT of the plurality of DUTs undergoing parallel testing on the test bench. The user can also interact with the core testing execution machine using the operator dashboard that includes a plurality of I-Frames. For example, the user/test operator might need to provide feedback to the core testing execution machine such as scanning in passwords, providing feedback on certain conditions associated with the test bench and/or core testing machine. As non-limiting examples, the feedback can include information needed for the testing procedure such as factory reset information, cage closed confirmation, Wi-Fi Protected Setup (WPS) LED confirmation, USB LED confirmation, LAN Coax LED confirmation, MocA WAN LED confirmation, etc. Thus, the user needs to be able to communicate asynchronously with various components of the device testing system. Such asynchronous communication is enabled by the operator dashboard with the plurality of I-Frames and associated web-sockets described in greater detail herein with respect to FIG. 3.

According to certain embodiments, the core testing machine comprises multiple slots (at the test bench) for installing a DUT in each slot. As a non-limiting example, each DUT in a respective slot is associated with its respective lightweight virtualization container (probes abstraction) and core testing executor/processor. For example, the core testing machine may comprise N core testing servers and each of the N core testing servers may be associated with M core testing executors/processors. According to certain embodiments, the core testing machine need not have every slot installed with a DUT in order to begin running the tests. The slots are used as needed. Further, the testing of a given DUT can start and finish independently of the other DUTs installed in the test bench of the core testing machine. According to certain embodiments, the use of DUT testing interfaces (probes) through software containers (virtualization containers) can avoid network conflicts while testing multiple DUTs simultaneously by the core testing machine.

Figure 3:
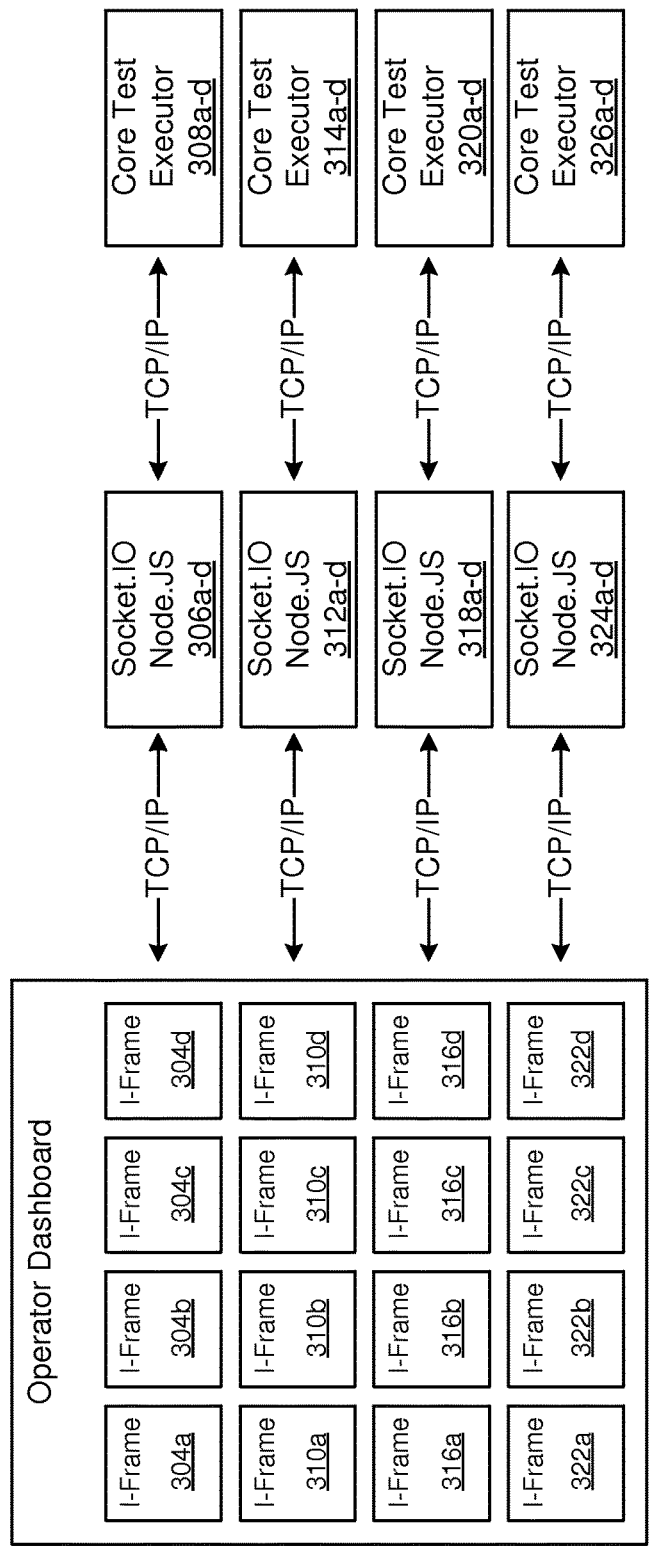
FIG. 3 illustrates a sample architecture showing bi-directional asynchronous communication between the operator dashboard, web-socket layer and core test execution machine, according to certain embodiments.

FIG. 3 illustrates a sample architecture showing bi-directional asynchronous communication between the operator dashboard, web-socket layer and core test execution machine, according to certain embodiments. FIG. 3 shows operator dashboard 302 (user interface) including a plurality of I-Frames (304a-d, 310a-d, 316a-d, 322a-d), a plurality of web-sockets (306a-d, 312a-d, 318a-d, 324a-d), and a plurality of test execution environments (308a-d, 314a-d, 320a-d, 326a-d). According to certain embodiments, each I-Frame can communicate asynchronously with a corresponding test testing executor environment. The asynchronous communication can be achieved because the Javascript socket.io on the client side browser dashboard communicates bi-directionally with corresponding web socket (Socket.io) server-side implementation in node.Js. In other words, each I-Frame (304a-d, 310a-d, 316a-d, 322a-d) can bi-directionally interact with its corresponding web socket (306a-d, 312a-d, 318a-d, 324a-d) server-side implementation. Each web socket (306a-d, 312a-d, 318a-d, 324a-d) can in turn interact bi-directionally with its corresponding test execution environment (308a-d, 314a-d, 320a-d, 326a-d). According to certain embodiments, the communication between the I-Frames and the web socket (Socket.io) server-side uses TCP/IP protocol. According to certain embodiments, the communication between the web sockets (Socket.io) server-side implementation in node.Js and the corresponding testing executor environments uses TCP/IP protocol. In the event that the TCl/IP connection is lost, the I-Frame socket.io on the client side attempts to reconnect to the web socket server side and displays the status of the connection to the user, accordingly. According to certain embodiments, the core test execution environment maintains the current state of the device testing execution and upon communication reconnection, pushes the state information to the browser implemented I-Frames of the operator dashboard. The foregoing feature allows users to refresh or restart their browser at any time without resulting in loss-of-state. Such a feature also allows the user to stop or abort a given test for a corresponding DUT in the test bench. Such a feature further allows a user to monitor the progress of one or more tests simultaneously using different browser sessions. Such browser sessions can be opened on the same device or on different devices. According to certain embodiments, a browser that supports CSS (cascade style sheets), Javascript, JQuery (or other suitable cross-platform JavaScript library designed to simplify the client-side scripting of HTML), and client side socket.IO is used.

Figure 4:
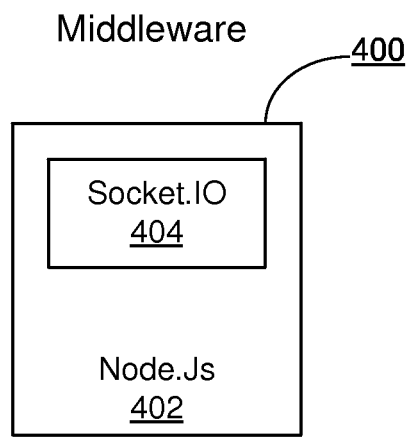
FIG. 4 illustrates a sample server side Node.Js layer, according to certain embodiments.

FIG. 4 illustrates a sample server side Node.Js layer, according to certain embodiments. FIG. 4 shows user interface middleware 400 that includes a server side Node.Js layer 402 and a socket-IO 404 (web socket layer). Socket-IO 404 is one implementation of the web socket protocol. As previously described, communication between the user interface and the core test execution environment is enabled through the web-socket layer. According to certain embodiments, such a web-socket layer can be implemented as a socket.io server hosted in node.js environment. Such a socket.io server is an event-driven server.

According to certain embodiments, the web socket layer can perform the following:
Enables real-time asynchronous bi-directional communication.
Provides real-time feedback to users on test execution results, etc., and prompts user for input required for the test execution.
Hides the core test execution environment from test clients.
Helps maintain the test execution state with the help of the core testing executor.

According to certain embodiments, it is possible to keep the web socket layer in the cloud such that the device testing can be executed remotely from anywhere. Probes test the following interfaces on the DUT (when such interfaces are available on the DUT):
Ethernet Local Area Network (LAN): assigned probe runs Ethernet-based connection tests Ethernet Wide Area Network (WAN): assigned probe runs Ethernet-based connection tests Multimedia over Coax Alliance (MoCA) LAN: assigned probe sets up MoCA connection, establishes connection, and runs MoCA-related connection tests MoCA WAN: assigned probe sets up MoCA connection, establishes connection, and runs MoCA-related connection tests Wireless 2.4 GHz: assigned probe sets up wireless connection, establishes connection, and runs WiFi-related connection tests on 2.4 GHz frequency Wireless 5.0 GHz: assigned probe sets up wireless connection, establishes connection, and runs WiFi-related connection tests on 5.0 GHz frequency Phone ports (FXS): assigned probe sets up phone service simulation, establishes connection, and runs phone-based connection tests USB: assigned probe runs USB-functionality tests Video: assigned probe runs video-related tests Audio: assigned probe runs audio-related tests According to certain embodiments, when executing a specific test for a given DUT, the core testing executor/processor loads and reads test configuration information (for example from an XML structure) and identifies the relevant test script that needs to be executed. Inputs that are needed for executing the relevant test script are retrieved and supplied as inputs to the relevant test script. The following is a non-limiting sample script.

Create DUT object & Environment Object
Verify Serial Number
Verify Warranty
Check Report Server
Check DUT Staging
   Checks for DUT Serial number in Database or Webservice Get DUT Readiness Information
   Checks Webservice for test readiness status of DUT in the test process Configure LXC Environment
Clear Environment Temp Files
Analyze DUT for Factory Reset
   Checks ability to login to DUT
   Asks operator to manually Factory Reset if unable to login Confirm Factory Reset (if needed)
   Waits for operator to confirm that DUT was factory reset and booted up properly
Check Ethernet LAN connections to DUT
   Ping connections: Eth LAN 1, 2, 3, 4
   Fails if any ping to these connections fail Detect DUT
   Checks connection to DUT through socket connection
Reset Password
   Operator scans password which is stored temporarily for use in the remainder of test until finished
Login to GUI
   Done through web-scraping
Get DUT Information and compare values
   Information retrieved through web-scraping
Enable Telnet
   Enables telnet on DUT through web-scraping
Factory Reset
   Factory resets DUT through telnet command
Enable Telnet after Factory Reset
   Enables telnet on DUT through web-scraping
Confirm Power, WAN Ethernet, and Internet LEDs
Confirm all LAN Ethernet LEDs
Confirm WiFi LED
Configure Wireless Network
   Through telnet commands
   Sets N Mode
   Enables Privacy
   Sets WPA (Wi-Fi Protected Access)
   Removes WEP (Wired Equivalent Privacy)
   Assigns WiFi Channel to DUT (channel different by slot)
   [Channel 1: slots 1, 4, 7, 10, 13, 16]
   [Channel 6: slots 2, 5, 8, 11, 14]
   [Channel 11: slots 3, 6, 9, 12, 15]
   Verifies changes through GUI
   Disables WiFi once done through telnet
Check Firmware Version and Upgrade Firmware (if needed)
   Firmware version: 40.21.18
Cage Closed Confirmation Check
   Asks Operator to Close Door on Cage
Connect Wireless Card
   Waits on shared Resource Server (located on TC) for Resource L2 (Layer 2) Lock
   Lock waiting timeout: 600 sec
   All L2 Locks are able to run in parallel but not when any L3 (Layer 3) Lock is running
   Obtains Lock
   Enables WiFi through telnet
   Set WiFi Card
   Total Retries allowed: 6 (2 sets of 3 retries)
   Ping WiFi from DUT
   L2 ARP Test on WiFi: must receive 10/10 ARP packets
   Total Retries allowed: 6 (2 sets of 3 retries)
   If either Set WiFi Card or L2 ARP Test Fail after its 3 retries, Ask Operator to Check Antennas
   Performs one more retry in full (set of 3 retries each for Set WiFi Card and L2 ARP Wifi Test) after Check Antennas
   Disables WiFi through telnet
   Releases Lock
Wireless to LAN Ethernet Speed Test
   Waits on shared Resource Server (located on TC) for Resource L3 Lock
   Lock waiting timeout: 1800 sec
   L3 Locks must be run one at a time and when no L2 Lock is running
   Obtains Lock
   Enables WiFi through telnet
   Connects WiFi Card
   Iperf3 Speed Test, 5 seconds for UDP Speed Test, 7 seconds for TCP Speed Test, Sending 200 Mbps Bandwidth
   Bandwidth must be greater than 60 Mbps on TCP (Reverse) or 70 Mbps on UDP (Forward)
   If Fail after 2 retries, ask operator to Check Antennas
   Retries up to 2 times more if still Fail
   Therefore, Total Retries allowed: 4 (2 sets of 2 retries)
   Runs sudo iwlist wlan0 scan and returns all Wireless Signals seen
   Results parsed to print all visible SSIDs and its matching Signal level
   Disables WiFi through telnet
   Releases Lock
Confirm WPS LED
Confirm LAN Coax LED
Confirm USB 1+2 LEDs
Configure WAN MoCA
Confirm WAN Coax LED
Ping WAN MoCA
L2 Test on LAN Ethernet
   Arp Test from Eth LAN 1 to Eth LAN 2, 3, 4
   Must receive 10/10 on all LAN connections
LAN Ethernet to LAN Ethernet Speed Test
   From Eth LAN 1 to Eth LAN 2, 3, 4
   Iperf3 Speed Test, 5 seconds Reverse and Forward, Sending 1200 Mbps Bandwidth Bandwidth must be greater than 700 Mbps
Total Retries allowed: 2
Check WAN and LAN MoCA Data Rates
   Rx and Tx Data rates for both WAN and LAN MoCA retrieved through telnet
   All Rates must be greater than 180 Mbps
LAN Ethernet to WAN MoCA FTP Speed Test
   From Eth LAN 1 to WAN MoCA
   Iperf3 Speed Test, 5 seconds Reverse and Forward, Sending 1200 Mbps Bandwidth
   Bandwidth must be greater than 60 Mbps
   Total Retries allowed: 2
LAN MoCA to LAN Ethernet FTP Speed Test
   From Eth LAN 1 to LAN MoCA
   Iperf3 Speed Test, 5 seconds Reverse and Forward, Sending 240 Mbps Bandwidth
   Bandwidth must be greater than 60 Mbps
   Total Retries allowed: 2
LAN MoCA to WAN MoCA FTP Speed Test
   From LAN MoCA to WAN MoCA
   Iperf3 Speed Test, 5 seconds Reverse and Forward, Sending 240 Mbps Bandwidth
   Bandwidth must be greater than 60 Mbps
   Total Retries allowed: 2
Enable WAN Ethernet
   Through telnet command
LAN Ethernet to WAN Ethernet FTP Speed Test
   From Eth LAN 1 to Eth WAN
   Iperf3 Speed Test, 5 seconds Reverse and Forward, Sending 1200 Mbps Bandwidth
   Bandwidth must be greater than 700 Mbps
   Total Retries allowed: 2
Clear Persistent Logs
Final Factory Restore According to certain embodiments, the core testing executor/processor uses a reflection and command design pattern to invoke the relevant configured script(s) corresponding to each DUT being tested. For example, in the command design pattern one or more of the following are encapsulated in an object: an object, method name, arguments. According to certain embodiments, the core testing executor/processor uses the Python "reflection" capability to execute the relevant test scripts for a given DUT. The core testing executor/processor is agnostic of the inner workings of the relevant test scripts for a given DUT.

According to certain embodiments, lightweight software containers are used to abstract the connection of probes to the different DUT interfaces in order to avoid conflicts. Non-limiting examples of virtualization containers are Linux containers. As a non-limiting example, Linux container (LXC) is an operating-system-level virtualization environment for running multiple isolated Linux systems (virtualization containers) on a single Linux control host. In other words, lightweight virtualization containers are used to ensure isolation across servers. By using virtualization containers, resources can be isolated, services restricted, and processes provisioned to have an almost completely private view of the operating system with their own process ID space, file system structure, and network interfaces. Multiple virtualization containers share the same kernel, but each virtualization container can be constrained to only use a defined amount of resources such as CPU, memory and I/O. The relevant test script might need to connect to the DUT interfaces directly or through the virtualization containers to execute the tests. The core testing executor/processor receives the test results from running the relevant test scripts. The core testing executor/processor can further process and interpret such results and can also send the results to the user's browser via web sockets. According to certain embodiments, the respective core testing executors/processors are in communication (e.g., Telnet/SSH secure shell) with the virtualization containers (there may be multiple virtualization containers). The virtualization containers (probes) are in communication with corresponding DUT interfaces using Telnet/SSH/TCP/UDP/HTTP/HTTPS, etc, as non-limiting examples.

According to certain embodiments, a user interface for a testing machine comprises: a plurality of I-Frames, wherein each I-Frame of at least a subset of the plurality of I-Frames is associated with a respective slot of a plurality of slots on the testing machine for installing, in the respective slot, a respective device under test (DUT) of a plurality of DUTs; and a plurality of client side web sockets associated with the plurality of I-Frames, wherein each client side web socket of at least a subset of the plurality of client side web sockets communicates with a corresponding web socket in a middleware web socket layer for achieving isolation and independent testing of each respective DUT from other respective DUTs of the plurality of DUTs.

According to certain embodiments, the middleware web socket layer enables real-time asynchronous communication between the user interface and a core testing environment of the testing machine.

According to certain embodiments, the middleware web socket layer enables real-time bi-directional communication between the user interface and a core testing environment of the testing machine.

According to certain embodiments, the client side web sockets communicate with the middleware web socket layer using TCP/IP communication.

According to certain embodiments, the middleware web socket layer communicates with a core testing environment of the testing machine using TCP/IP communication.

According to certain embodiments, the middleware web socket layer can be a cloud based implementation.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A testing machine, comprising:
   a test bench having a plurality of test slots, each of the test slots configured to receive and connect to one device under test (DUT) of a plurality of devices under test (DUTs);
   at least one core testing processor connected to the plurality of test slots and configured to execute test scripts on at least one DUT of the plurality of DUTs;
   a user interface having a plurality of I-Frames, wherein:
      each I-Frame of at least a subset of the plurality of I-Frames is configured to communicate with a respective test slot of the plurality of test slots; and
   a plurality of client side web sockets associated with the plurality of I-Frames, wherein:
      each client side web socket of at least a subset of the plurality of client side web sockets communicates with a corresponding web socket in a middleware web socket layer for achieving isolation and independent testing of each respective DUT from other DUTs of the plurality of DUTs.

2. The testing machine of claim 1, wherein the middleware websocket layer enables real-time asynchronous communication between the user interface and the at least one core testing processor.

3. The testing machine of claim 1, wherein the middleware web socket layer enables real-time bi-directional communication between the user interface and the at least one core testing processor.

4. The testing machine of claim 1, wherein the client side web sockets communicate with the middleware web socket layer using TCP/IP communication.

5. The testing machine of claim 1, wherein the middleware web socket layer communicates with the at least one core testing processor using TCP/IP communication.

6. The testing machine of claim 1, wherein the middleware web socket layer can be a cloud based implementation.

7. A system for simultaneously testing a plurality of devices under test, comprising:
a test bench having a plurality of test slots, each of the test slots configured to receive and connect to one device under test of a plurality of devices under test;
at least one testing subsystem connected to the plurality of test slots and configured to execute test scripts on the plurality of devices under test; and
an operator dashboard for providing information to and receiving input from a user and configured to communicate with the at least one testing subsystem, the operator dashboard including a plurality of frames where each frame of the plurality of frames is associated with one test slot of the plurality of test slots, wherein
each frame of the plurality of frames is configured to communicate information regarding one test slot of the plurality of test slots independently and asynchronously of other frames and their respective test slots and enables the user to configure each test slot and interact with each device under test independently.

8. The system of claim 7, wherein at least one frame of the plurality of frames is an HTML iframe.

9. The system of claim 7, wherein each frame of the plurality of frames is configured to communicate with the testing subsystem via a web socket.

10. The system of claim 7, wherein each test slot of the plurality of test slots comprises at least one probe configured to communicate with one device under test of the plurality of devices under test.

11. The system of claim 10, wherein the at least one probe is selected from a group comprising Ethernet WAN, Ethernet LAN, MoCA WAN, MoCA LAN, Wi-Fi, USB, video, and audio.

12. The system of claim 11, wherein each probe is associated with a virtualization container that abstracts a connection between the probe and one of the plurality of devices under test.

13. The system of claim 7, wherein the at least one testing subsystem is further configured to identify test scripts relevant to each device under test of the plurality of devices under test and retrieve inputs required by the test scripts.

14. The system of claim 7, wherein each frame of the plurality of frames is further configured to provide a user with real-time continuous feedback regarding its respective device under test.

15. A test system for simultaneously testing a plurality of devices under test, comprising:
a test bench having a plurality of test slots, each test slot of the plurality of test slots configured to receive and connect to one device under test of a plurality of devices under test; and
an operator dashboard for providing information to and receiving input from a user, the operator dashboard including a plurality of frames where each frame of the plurality of frames is associated with one test slot of the plurality of test slots, wherein
each frame is configured to communicate information regarding one test slot of the plurality of test slots independently and asynchronously of other frames and their respective test slots.

16. The test system of claim 15, wherein the plurality of frames comprise HTML iframes.

17. The test system of claim 15, wherein each frame of the plurality of frames is configured to communicate with a testing subsystem via a web socket.

18. The test system of claim 15, wherein each test slot comprises at least one probe configured to communicate with one device under test of the plurality of devices under test.

19. The test system of claim 18, wherein each probe of the plurality of probes is associated with a virtualization container that abstracts a connection between the probe and one device under test of the plurality of devices under test.

20. The test system of claim 15, wherein each frame of the plurality of frames is further configured to provide a user with real-time continuous feedback regarding its respective device under test.

* * * * *